US010328647B2

(12) United States Patent
Jones et al.

(10) Patent No.: US 10,328,647 B2
(45) Date of Patent: Jun. 25, 2019

(54) EXPANDABLE BELT AND TREAD DRUM HAVING IRREGULAR SEGMENT PROFILES

(71) Applicant: Davian Enterprises, LLC, Greenback, TN (US)

(72) Inventors: Patrick Jones, Sarasota, FL (US); Ian Smith, Maryville, TN (US); William Jones, West Midlands (GB); Robert L. Marcus, Jr., Knoxville, TN (US)

(73) Assignee: Davian Enterprises, LLC, Greenback, TN (US)

( * ) Notice: Subject to any disclaimer, the term of this patent is extended or adjusted under 35 U.S.C. 154(b) by 472 days.

(21) Appl. No.: 14/617,434

(22) Filed: Feb. 9, 2015

(65) Prior Publication Data

US 2015/0224729 A1 Aug. 13, 2015

Related U.S. Application Data

(60) Provisional application No. 61/937,105, filed on Feb. 7, 2014.

(51) Int. Cl.

*B29D 30/24* (2006.01)
*B29D 30/06* (2006.01)
*B29D 30/26* (2006.01)

(52) U.S. Cl.

CPC ............. *B29D 30/06* (2013.01); *B29D 30/24* (2013.01); *B29D 30/242* (2013.01); *B29D 2030/2642* (2013.01); *B29D 2030/2657* (2013.01)

(58) Field of Classification Search

CPC .......... B29D 30/242; B29D 2030/2642; B29D 2030/265; B29D 2030/2657

See application file for complete search history.

(56) References Cited

U.S. PATENT DOCUMENTS

| | | | |
|---|---|---|---|
| 1,233,567 | A | 7/1917 | Furry |
| 1,750,728 | A | 3/1930 | Robison |
| 2,168,897 | A | 8/1939 | Bostwick |
| 2,201,469 | A | 5/1940 | Bostwick |
| RE22,369 | E | 8/1943 | Bostwick |
| 2,335,169 | A | 11/1943 | Bostwick |

(Continued)

FOREIGN PATENT DOCUMENTS

| | | |
|---|---|---|
| CA | 2188639 | 10/1996 |
| CA | 2219387 | 10/1997 |

(Continued)

OTHER PUBLICATIONS

Definition of "Tortuous"; retrieved from "dictionary.com" on Jun. 8, 2018.*

(Continued)

*Primary Examiner* — Geoffrey L Knable

(74) *Attorney, Agent, or Firm* — Pitts & Lake, P.C.

(57) ABSTRACT

An improved belt and tread drum incorporating an improved segment is disclosed. Segments are mounted in side-by-side relationship about a central axis for radial movement inwardly and outwardly with respect to the central axis and include arcuate outer surfaces that collectively define an outer circumferential working surface of the drum. The segments each define opposite first and second longitudinal side margins, at least one of the first and second longitudinal side margins defining an irregular longitudinal profile.

17 Claims, 11 Drawing Sheets

28 A B C D 54 44 56 52 34 46 54 56

(56) References Cited

U.S. PATENT DOCUMENTS 2,353,767 A 7/1944 Schnedarek
2,367,831 A 1/1945 Manson
2,529,861 A 11/1950 Angell et al.
2,614,057 A 10/1952 Ericson et al.
2,699,198 A 1/1955 Balzhiser
2,715,932 A 8/1955 Frazier
2,728,616 A 12/1955 Potter
3,077,918 A 2/1963 Noall
3,101,289 A 8/1963 Giletta et al.
3,111,444 A 11/1963 Pouilloux
3,111,445 A 11/1963 Pouilloux
3,140,216 A 7/1964 Shilts et al.
3,207,648 A 9/1965 Shilts
3,346,434 A 10/1967 Fulton
3,366,526 A 1/1968 Winslow
3,375,154 A 3/1968 Ruttenberg et al.
3,405,023 A 10/1968 Eckenwiler et al.
3,408,244 A 10/1968 Frazier
3,485,700 A 12/1969 Cooper et al.
3,489,634 A 1/1970 Pizzo et al.
3,507,528 A 4/1970 Desmarchais
3,547,733 A 12/1970 Leblond
3,598,673 A 8/1971 Caretta
3,644,162 A 2/1972 Appleby et al.
3,676,261 A 7/1972 Appleby et al.
3,694,290 A 9/1972 Pacciarini et al.
3,695,974 A 10/1972 Henley
3,784,426 A 1/1974 Woodhall et al.
3,787,262 A 1/1974 Appleby et al.
3,816,218 A 6/1974 Felten
3,837,968 A 9/1974 Marra
3,867,229 A 2/1975 Marra
3,873,398 A 3/1975 Yokoo et al.
3,887,423 A 6/1975 Gazuit
3,929,546 A 12/1975 Katagiri et al.
3,948,717 A 4/1976 Suzuki et al.
4,010,058 A 3/1977 Kubinski et al.
4,105,487 A 8/1978 Suzuki et al.
4,126,507 A 11/1978 Kim et al.
4,131,500 A 12/1978 Wilde et al.
4,149,927 A 4/1979 Lauer, Jr.
4,151,035 A 4/1979 Jellison
4,155,796 A 5/1979 Rambacher
4,210,482 A 7/1980 Collins
4,220,494 A 9/1980 Kawaida et al.
4,230,517 A 10/1980 Enders
4,239,579 A 12/1980 Felten et al.
4,292,112 A 9/1981 Kumagai
4,312,696 A 1/1982 Bryant
4,324,604 A 4/1982 Alexander et al.
4,325,764 A 4/1982 Appleby et al.
4,392,899 A 7/1983 Bertoldo
4,425,180 A 1/1984 Samokhvalov et al.
4,436,574 A 3/1984 Long et al.
4,445,962 A 5/1984 Felder
4,469,546 A 9/1984 Klose et al.
4,472,233 A 9/1984 Fukamachi et al.
4,473,427 A 9/1984 Irie
4,510,012 A 4/1985 Kawaida et al.
4,519,279 A 5/1985 Ruggeri
4,521,269 A 6/1985 Ozawa
4,547,251 A 10/1985 Landsness
4,582,557 A 4/1986 Enders
4,626,302 A 12/1986 Casey et al.
4,636,277 A 1/1987 Owen et al.
4,729,541 A 3/1988 Maier
4,780,171 A 10/1988 Byerley
4,798,647 A 1/1989 Haas
4,861,123 A 8/1989 Russell
4,861,173 A 8/1989 Kemp
5,047,108 A 9/1991 Byerley
5,066,354 A 11/1991 Benjamin
5,071,498 A 12/1991 Nishiide et al.
5,078,819 A 1/1992 Sergel et al.
5,089,077 A 2/1992 Byerley
5,203,947 A 4/1993 Boeker
5,223,074 A 6/1993 Miyanaga et al.
5,225,028 A 7/1993 Bierens
5,232,542 A 8/1993 Norjiri et al.
5,264,068 A 11/1993 Masuda
5,320,701 A 6/1994 Jellison et al.
5,354,405 A 10/1994 Byerley
5,380,384 A 1/1995 Tokunaga et al.
5,441,587 A 8/1995 Byerley
5,505,803 A 4/1996 Byerley
5,558,733 A 9/1996 Byerley
5,618,374 A 4/1997 Byerley
5,635,016 A 6/1997 Byerley
5,709,768 A 1/1998 Byerley
5,735,995 A 4/1998 Bull et al.
5,755,922 A 5/1998 Baldoni et al.
6,004,250 A 12/1999 Byerley
6,007,268 A 12/1999 Whittington et al.
6,013,147 A 1/2000 Byerley
6,058,999 A 5/2000 Roberts et al.
6,117,269 A 9/2000 Pizzorno
6,152,645 A 11/2000 Sanford
6,238,292 B1 5/2001 Pelkey
6,390,166 B1 5/2002 Roberts et al.
6,457,505 B1 10/2002 Byerley
6,539,998 B2 4/2003 Sergel et al.
6,571,682 B2 6/2003 Roberts et al.
6,585,022 B1 7/2003 Rex
6,602,372 B1 8/2003 Byerley
6,673,183 B2 1/2004 Byerley
6,793,752 B2 9/2004 Lemaire et al.
7,000,905 B1 2/2006 Lutter et al.
7,287,772 B2 10/2007 James
7,288,160 B2 10/2007 Roedseth et al.
7,637,665 B2 12/2009 Cook
7,699,952 B2 4/2010 Linne et al.
7,837,816 B2 11/2010 Liinne et al.
8,056,597 B2 11/2011 Byerley
8,091,602 B2 1/2012 Roberts et al.
8,272,417 B2 9/2012 Painter
8,555,944 B2 10/2013 Painter
9,044,908 B2 * 6/2015 Babin ................. B29D 30/246
2003/0197389 A1 10/2003 Moilanen et al.
2008/0202690 A1 8/2008 Painter
2010/0101732 A1 4/2010 Howley et al.
2010/0186864 A1 7/2010 Koopman et al.
2011/0303366 A1 12/2011 Byerley
2012/0017720 A1 1/2012 Painter
2012/0033906 A1 2/2012 Painter
2012/0090787 A1 4/2012 Jones et al.
2012/0168087 A1 7/2012 Byerley
2012/0222822 A1 9/2012 Jones et al.
2012/0256434 A1 10/2012 Roberts et al.
2013/0008611 A1 1/2013 Marcus et al.

FOREIGN PATENT DOCUMENTS

CA 2142004 4/2006
DE 19913241 9/2000
DE 102009025759 11/2010
EP 1688240 11/2004
EP 1621327 6/2005
EP 2155481 2/2010
EP 2504159 10/2012
JP 2007-136935 A * 6/2007
MX 200554 1/2001
SU 1106682 A * 8/1984
WO WO2001/007242 2/2001
WO WO2006/003058 1/2006
WO WO2008/025598 3/2008
WO 2009058296 5/2009
WO WO2010/052103 5/2010
WO WO2011/159343 12/2011
WO WO2012/021160 2/2012
WO WO2012/031193 3/2012

(56) References Cited

OTHER PUBLICATIONS

Supp'l European Search Report; European Patent Office; EPO Form 1503; dated Sep. 8, 2017.

* cited by examiner

A
B
C
D
54
56
46
44
28b
68
28a
44
54
56

65
67
54a
31
67
56a
65
A
B
C
D
E

EXPANDABLE BELT AND TREAD DRUM HAVING IRREGULAR SEGMENT PROFILES

CROSS-REFERENCE TO RELATED APPLICATIONS

This application claims the benefit of U.S. patent application Ser. No. 13/964,387, filed on Aug. 12, 2013, and U.S. Provisional Patent Application No. 61/937,105, filed on Feb. 7, 2014.

STATEMENT REGARDING FEDERALLY-SPONSORED RESEARCH OR DEVELOPMENT

Not Applicable

BACKGROUND OF THE INVENTION

1. Field of Invention

The present general inventive concept relates to devices that are useful in the manufacture of vehicle tires. More particularly, the present general inventive concept relates to an improved belt and tread drum having irregular segment profiles.

2. Description of the Related Art

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass (often referred to as "stitching" the belt and tread package), may be performed during the course of, or following, one or more of the aforementioned steps.

The formation of a tire carcass is typically performed using a tire building drum, of the type described in U.S. Pat. No. 6,457,505. Such a tire building drum typically defines a radially expandable and contractible cylindrical working surface upon which a tire carcass is formed. Subsequent to the formation of the tire carcass on the cylindrical working surface, such tire carcass may be transferred to an expansion drum, of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is joined to the tire carcass.

Formation of a belt and tread package of a tire is typically accomplished using a belt and tread drum, of the type disclosed in U.S. Pat. No. 6,013,147. Such a belt and tread drum typically has an outer cylindrical surface, or circumference, comprising a plurality of elongated segments, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially nonexpandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

During formation of the belt and tread package on the belt and tread drum, it is not uncommon for the belt and tread drum and accompanying tooling to be configured such that the elongated segments of the belt and tread drum apply considerable pressure to interior surfaces of the belt and tread package, in part to assist in maintaining a uniform toroid shape of the tire component during formation. Such high pressures applied to the interior surfaces of the tire component can result in at least a portion of the arced exterior surfaces of the elongated segments becoming at least partially imprinted in the tire component, resulting in the formation of very slight imprints of the arcuate exterior surfaces of the elongated segments, and corresponding very slight bulges adjacent the imprints, in the tire component. Further, it is known that the radius of curvature of the various arcuate segments forming the belt and tread drum's outer cylindrical surface is fixed by the rigidity of the segments, thus rendering it impossible for the segments to be moved between radially expanded and contracted positions and collectively provide perfectly-formed cylindrical surfaces at each of these two positions. If, for example, the circumference of the drum is adjusted to a size at which the segments are positioned at a distance from the longitudinal axis which exceeds the radius of curvature of each segment arc, there will exist regions about the drum circumference where the interface between each adjacent arcuate surface curves very slightly radially inwardly from the central portions of the segments. Conversely, if the circumference of the drum is adjusted to a size at which the segments are positioned at a distance from the longitudinal axis less than the radius of curvature of each segment arc, there will exist regions about the drum circumference where the interface between each adjacent arcuate surface curves very slightly radially outwardly from the central portions of the segments. In either case, the outer circumference of the belt and tread drum will be very slightly out-of-round. If these out-of-round regions are large enough (as may occur, for example, when the drum is expanded to accommodate a tire of relatively large diameter), it is possible that the drum may produce undesirable alternating imprints and bulges of the slightly out-of-round exterior surface of the tire building drum on a tire constructed with the drum. Such imprints and bulges are undesirable in that they may later manifest as irregularities in a finished tire, which may, in certain circumstances, produce undesirable effects, such as for example vibration, noise, and/or resonance of the rolling tire.

In light of the above, an improved segment for a belt and tread drum, and a belt and tread drum which includes features for limiting resonance of a tire manufactured using the belt and tread drum, are desired.

BRIEF SUMMARY OF THE INVENTION

The present general inventive concept, in various example embodiments, provides a segment defining a portion of an outer circumferential working surface of a tire building drum. In various embodiments, the segment has an arcuate outer surface and defines opposite first and second longitudinal side margins. At least one of the first and second longitudinal side margins may define an irregular longitudinal profile.

In various embodiments, the at least one longitudinal side margin may define a plurality of alternating slots and fingers extending therefrom along an arcuate dimension of the segment. In some embodiments, at least one of the fingers may have a length along the arcuate dimension of the segment differing from a length of a longitudinally adjacent finger. In other embodiments, each of the fingers may have a length along the arcuate dimension of the segment differing from a length of a longitudinally adjacent finger. In still other embodiments, each of the fingers may have a length along the arcuate dimension of the segment differing from the lengths of the remaining fingers along the at least one longitudinal side margin.

In certain embodiments, the first longitudinal side margin may define a first set of alternating slots and fingers extending therefrom along an arcuate dimension of the segment and the second longitudinal side margin defines a second set of alternating slots and fingers extending therefrom along an arcuate dimension of the segment. In some embodiments, each of the fingers of the first set may have a length along the arcuate dimension of the segment differing from a length of a longitudinally adjacent finger. In some embodiments, each of the fingers of the second set may have a length along the arcuate dimension of the segment differing from a length of a longitudinally adjacent finger. In some embodiments, the slots of the first set may be shaped for mating engagement with the fingers of the second set, and the slots of the second set may be shaped for mating engagement with the fingers of the first set. In some embodiments, each finger of the first set may have a length along the arcuate dimension of the segment differing from the lengths of the remaining fingers of the first set, and each finger of the second set may have a length along the arcuate dimension of the segment differing from the lengths of the remaining fingers of the second set.

In various example embodiments of the present general inventive concept, an improvement may be provided to a segment forming a portion of an outer cylindrical working surface of a belt and tread drum of the type useful for manufacturing vehicle tires. In certain embodiments, the segment may comprise an outer surface defining a portion of the cylindrical working surface, the outer surface having a longitudinal dimension parallel to a central axis of the cylindrical working surface and a circumferential dimension along a circumference of the cylindrical working surface. A plurality of alternating slots and fingers may be defined along the outer surface and may extend along the circumferential dimension of the segment. Each finger may be sized and shaped to at least partially mate with a corresponding slot of an adjacent segment. In various embodiments, longitudinally adjacent slots and fingers along the outer surface have non-uniform circumferential lengths.

In some embodiments, the outer surface may have opposite first and second longitudinal side margins, wherein the plurality of alternating slots and fingers are arranged along both first and second longitudinal side margins of the outer surface. Each finger of the first side margin may be sized and shaped to at least partially mate with a corresponding slot of a second side margin of an adjacent segment, and each slot of the first side margin may be sized and shaped to at least partially mate with a corresponding finger of a second side margin of an adjacent segment. Each finger may have a length along the circumferential dimension of the segment differing from a length of a longitudinally adjacent finger. Each finger of the first side margin may have a length along the circumferential dimension of the segment differing from the lengths of the remaining fingers of the first side margin, and each finger of the second side margin may have a length along the circumferential dimension of the segment differing from the lengths of the remaining fingers of the second side margin.

In various embodiments of the present general inventive concept, a belt and tread drum for use in the manufacture of vehicle tires may be provided. The drum may comprise a plurality of segments mounted in side-by-side relationship about a central axis for radial movement inwardly and outwardly with respect to the central axis. The segments may include arcuate outer surfaces which collectively define an outer circumferential working surface of the drum. Each segment may define a plurality of alternating slots and fingers extending from each of opposite first and second longitudinal side margins of the segment along a circumferential dimension of the drum, each finger of each first side margin being sized and shaped to at least partially mate with a corresponding slot of a second side margin of an adjacent segment, and each slot of each the first side margin being sized and shaped to at least partially mate with a corresponding finger of a second side margin of an adjacent segment. At least one finger along at least one of the first and second side margins of at least one segment may have a circumferential length differing from the lengths of the remaining fingers along the side margin.

In various example embodiments, each of the fingers along at least one side margin of at least one segment may have a circumferential length differing from the circumferential length of a longitudinally adjacent finger. Each side margin of each segment may define at least one finger having a circumferential length differing from the circumferential length of at least one longitudinally adjacent finger. In some embodiments, each pattern of alternating slots and fingers of non-uniform circumferential lengths of each first side margin of each segment may differ from the pattern of alternating slots and fingers of non-uniform circumferential lengths of the first side margin of an adjacent segment. In some embodiments, each of the fingers along each side margin of each segment may have a circumferential length differing from the circumferential length of a longitudinally adjacent finger.

Additional aspects and advantages of the present general inventive concept will be set forth in part in the description which follows, and, in part, will be obvious from the description, or may be learned by practice of the present general inventive concept.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION OF THE INVENTION

Figure 1:
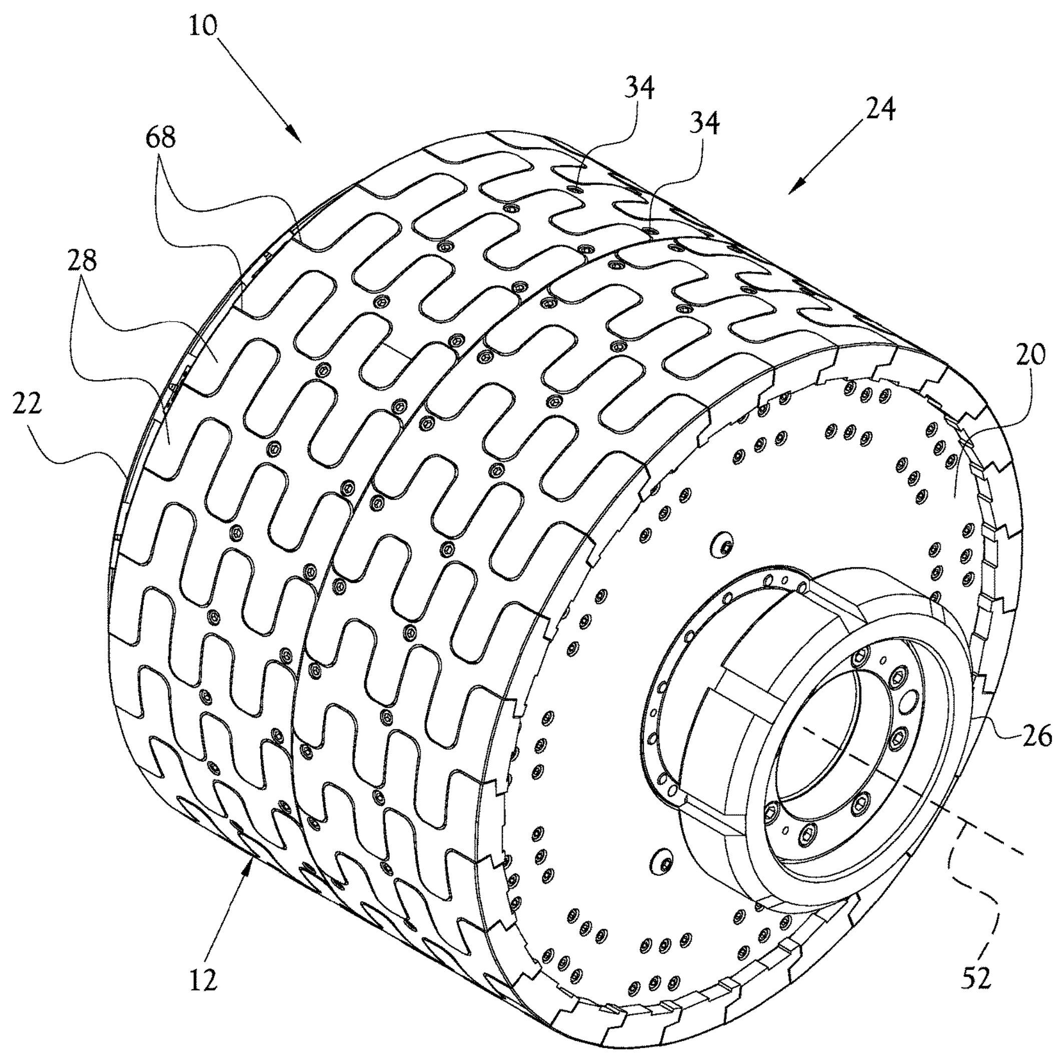
FIG. 1 is a perspective view showing one embodiment of an expandable belt and tread drum having irregular segment profiles constructed in accordance with several features of the present general inventive concept.
Figure 2:
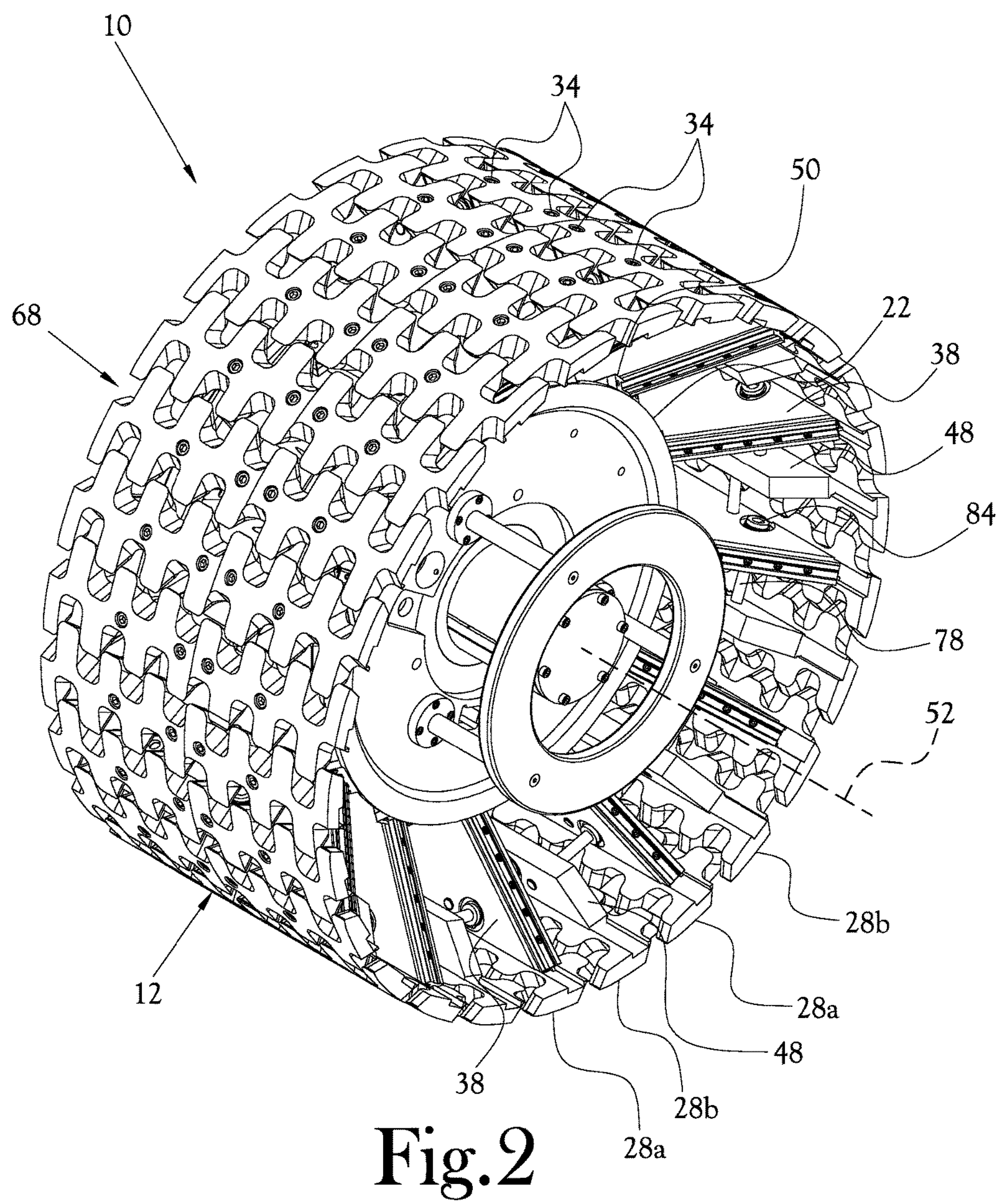
FIG. 2 is another perspective view of the expandable belt and tread drum of FIG. 1, showing the drum in an expanded position.

Reference will now be made to the example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Referring now to the Figures in which like reference numerals indicate like or corresponding features, there is shown in FIGS. 1-5 a belt and tread drum 10 within which features of the present general inventive concept are embodied. The belt and tread drum 10, or "drum," defines generally an outer circumference comprising a plurality of arcuate, circumference-defining segments 28 arranged in a side-by-side relationship to form an outer circumferential working surface 12 of the drum 10. The segments 28 are mounted such that they may be moved radially inward and outward toward and away from a centerline 52 of the drum 10. Thus, the outer working surface 12 of the drum 10 is capable of expanding to various diameters to accommodate the construction of belt and tread packages for tires of different diameters. Therefore, when tires of various sizes need to be made on a given, or single, drum, the diameter of the circumference of the drum 10 may be adjusted accordingly. Additionally, the drum is able to be collapsed from an expanded condition to permit the belt and tread package to be removed for transfer to a subsequent stage of the tire making process. As will further be discussed below, in various embodiments, each of the segments 28 of the drum defines an irregular longitudinal profile along a longitudinal dimension of the drum 10, such that the drum 10 does not produce a regular pattern of imprints or bulges in a tire component manufactured using the drum 10, thereby limiting resonance in a finished tire manufactured using the tire component.

With reference to FIGS. 1-5, the belt and tread drum 10 is generally of cylindrical geometry, defining respective longitudinal, radial, and circumferential dimensions. The depicted drum 10 includes generally first and second disc-shaped end plates 20 and 22, respectively, disposed at respective longitudinal ends of the drum 10, and a central body portion, indicated generally by the numeral 24, which is disposed between the end plates 20 and 22. The body portion 24 is made up of a plurality of relatively movable components, the sum of whose movements results in controlled and measured change in the outer circumference of the body portion 24 to accommodate the manufacture of tires of various sizes (i.e. tires of different diameters). Selection and control over the maximum circumference of the drum is provided for externally of the drum by means of an adjustment mechanism 26.

Figure 3:
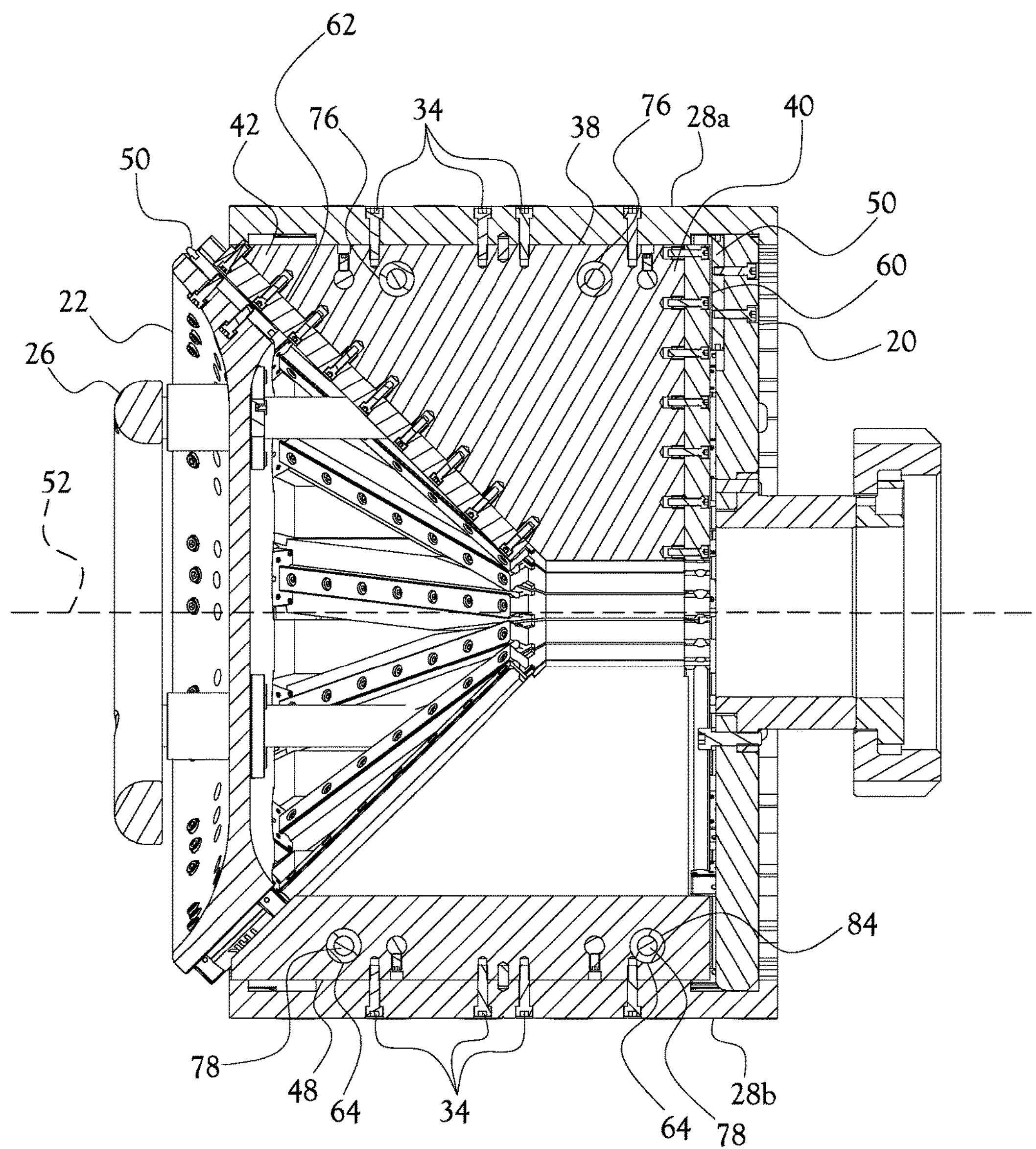
FIG. 3 is a cross-sectional side view of the expandable belt and tread drum of FIG. 1, showing the drum in a collapsed position.
Figure 4:
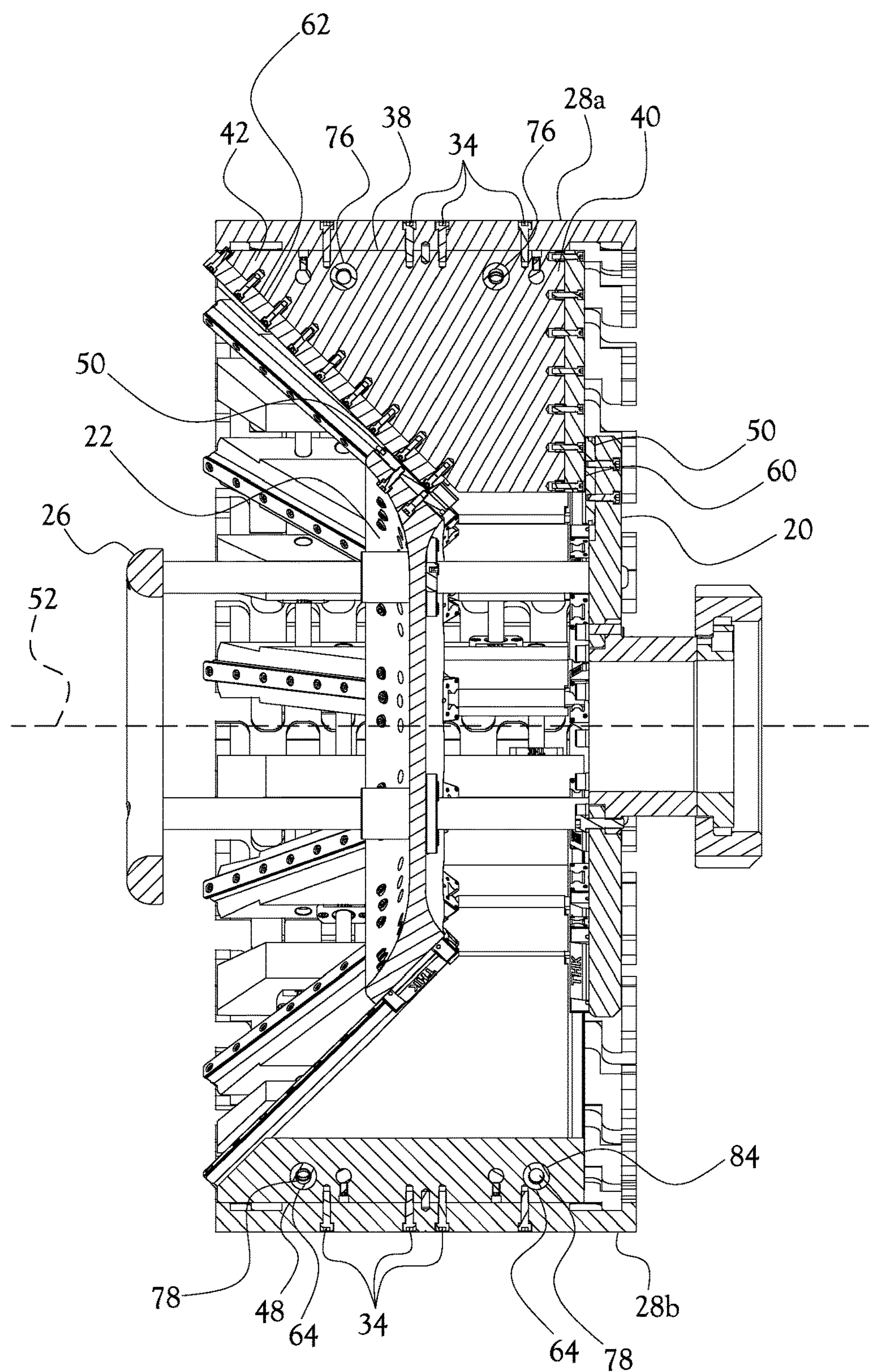
FIG. 4 is another cross-sectional side view of the expandable belt and tread drum of FIG. 1, showing the drum in an expanded position.

More specifically, the body portion 24 of the depicted belt and tread drum 10 includes a plurality of circumference-defining segments 28 whose outer arcuate surfaces collectively define an outer circumferential working surface of the drum 10. In the illustrated embodiment, the various segments 28 about the circumference of the drum 10 are grouped into a first set of segments 28*a*, and a second set of segments 28*b*, (see FIG. 2) with the segments of the sets 28*a*, 28*b* alternating about the circumference of the working surface 12, such that a pair of segments 28*a* of the first set lie immediately circumferentially adjacent, and on opposite longitudinal sides of, each segment 28*b* of the second set, and vice-versa. Each segment 28*a* of the first set of segments is joined, as with the illustrated bolts 34, a weld, integral connection, or the like, to a planar cam element 38 disposed radially inwardly of the segment 28*a*. With reference to FIGS. 3 and 4, each cam element 38 defines two opposite side ends 40, 42 extending radially outwardly from the longitudinal centerline 52 of the drum 10. In the illustrated embodiment, each side end 40, 42 of each cam element 38 defines a track 60, 62 that is slidably engaged by an associated radially-extending cam member 50. The various cam members 50 are provided at regular, spaced apart locations about respective circumferential perimeters of the inner surfaces of the opposite end plates 20 and 22.

In various embodiments, each of the cam elements 38 defines an inwardly-tapered shape along a radial dimension thereof, such that respective radially-inward ends of corresponding tracks 60, 62 are closer to one another than respective radially-outward ends. Thus, movement of the first and second end plates 20, 22 toward one another results in expansion of the cam elements 38 and associated segments 28 axially away from the longitudinal centerline 52 of the drum 10, while movement of the first and second end plates 20, 22 away from one another results in contraction of the cam elements 38 and associated segments 28 axially toward the longitudinal centerline 52 of the drum 10. For example, in the illustrated embodiment, the cam members 50 associated with the first end plate 20 and the corresponding tracks 60 associated with the first side ends 40 of the cam elements 38 each extend directly radially outwardly, at substantially right angles to the longitudinal centerline 52 of the drum 10, while the cam members 50 associated with the second end plate 22 and the corresponding tracks 62 associated with the second side ends 42 of the cam elements 38 each extend at an angle both radially and longitudinally outwardly, at acute angles to the longitudinal centerline 52 of the drum 10. In this configuration, each cam element 38 defines a generally trapezoidal shape, with tapered ends of the respective cam elements 38 extending inwardly toward the longitudinal centerline 52.

Figure 5:
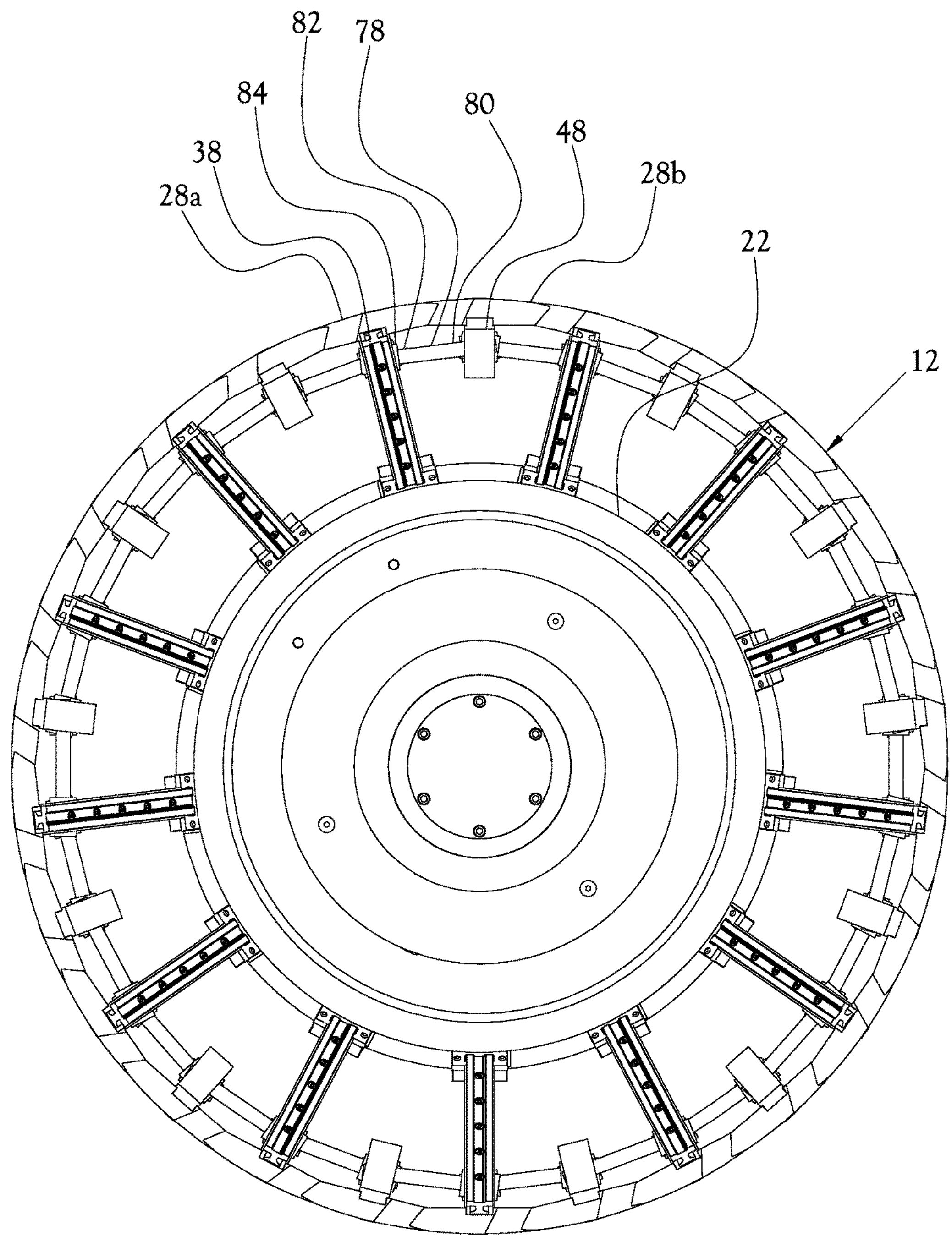
FIG. 5 is an end view of the expandable belt and tread drum of FIG. 1, showing the drum in an expanded position.

Similarly to the above-discussed segments 28*a* of the first set of segments, each segment 28*b* of the second set of segments is joined, as with the illustrated bolts 34, a weld, integral connection, or the like, to a block 48 disposed radially inwardly of the segment 28*b*. Each block 48 is linked to the cam elements 38 circumferentially adjacent the block 48 such that the block 48 is maintained circumferentially between its adjacent cam elements 38 as the cam elements 38 are moved radially toward and away from the longitudinal centerline 52 of the drum 10. Thus, throughout expansion and contraction of the outer circumferential working surface of the drum 10, the linkage of each block 48 to its circumferentially adjacent cam elements 38 maintains each segment 28*b* of the second set of segments in a substantially cylindrical configuration circumferentially between two adjacent segments 28*a* of the first set of segments. For example, in the illustrated embodiment, each block 48 defines a plurality of through bores 64, each of which is aligned axially with, and is thus in register with, a through bore 76 defined by a circumferentially adjacent cam element 38. As best shown in FIG. 5, for each pair of aligned through bores 64, 76 of each block 48 and adjacent cam element 38, a guide bar 78 is provided having a first end 80 fixedly secured within one of the through bores 64, 76 and an opposite second end 82 slidably received through the other of the through bores 64, 76. Each of the guide bars 78 is of a length selected to ensure that its second end 82 remains within its respective through bore throughout expansion and contraction of the drum 10. Thus, throughout expansion and contraction of the drum 10, each of the guide bars 78 serves to maintain its associated through bores 64, 76 in substantial registration with one another. Furthermore, for each of the guide bars 78 extending between any given block 48 and its adjacent cam elements 38, all such guide bars 78 extend to or from the block 48 at a common angle of extension in relation to a radial plane defined along the longitudinal centerline 52 of the drum 10 and extending radially-outward through a centerline of the block 48. In this configuration, throughout expansion and contraction of the drum 10, each block 48 is maintained circumferentially between its adjacent cam elements 38, and thus, each segment 28*b* of the second set of segments is maintained in a cylindrical configuration circumferentially between two adjacent segments 28*a* of the first set of segments.

It will be recognized that additional elements of the above-discussed linkage between the various blocks 48 and their adjacent cam elements 38 may be provided without departing from the spirit and scope of the present general inventive concept. For example, in several embodiments, for each through bore having a guide bar 78 slidably received therein, a bearing 84 is received within the through bore, surrounding the circumference of the guide bar 78. The bearing 84 may provide a snug, slidable relationship between each guide bar 78 and its associated block 48 or cam element 38, and may assist in maintaining axial alignment of the through bores 64, 76 associated with the guide bar 78. In some embodiments, for each guide bar 78 extending between associated through bores 64, 76 of adjacent blocks 48 and cam elements 38, a compression spring (not shown) may be provided, with each compression spring wrapping around its associated guide bar 78 and extending between the through bores 64, 76 associated therewith. Each compression spring may, in various embodiments, serve to bias the associated block 48 and cam element 38 circumferentially away from one another and radially away from the longitudinal centerline 52 of the drum 10, thereby assisting in maintaining the cylindrical arrangement of each of the segments 28*a*, 28*b* by maintaining each block 48 radially outward from the centerline 52 of the drum 10 and circumferentially between its adjacent cam elements 38.

As noted above, movement of the first and second end plates 20, 22 toward and away from one another results in adjustment of the overall diameter of the outer circumference of the drum 10. For example, FIGS. 1 and 3 depict the drum 10 at its fully collapsed, minimum circumference, with the first and second end plates 20, 22 separated from one another along the centerline 52 of the drum 10. By comparison, in FIGS. 2, 4, and 5, the drum 10 is depicted at its maximum expanded circumference, with the first and second end plates 20, 22 drawn relatively close to one another. It will further be recognized that additional elements of the adjustment mechanism 26, such as for example guide rails, shafts, and stops for guiding and limiting movement of the first and second end plates 20, 22, and springs and the like for biasing the drum 10 toward a desired expanded or collapsed position, may be provided. However, it will be understood that a complete description of such mechanisms is not necessary for a full understanding of the present general inventive concept.

Figure 6:
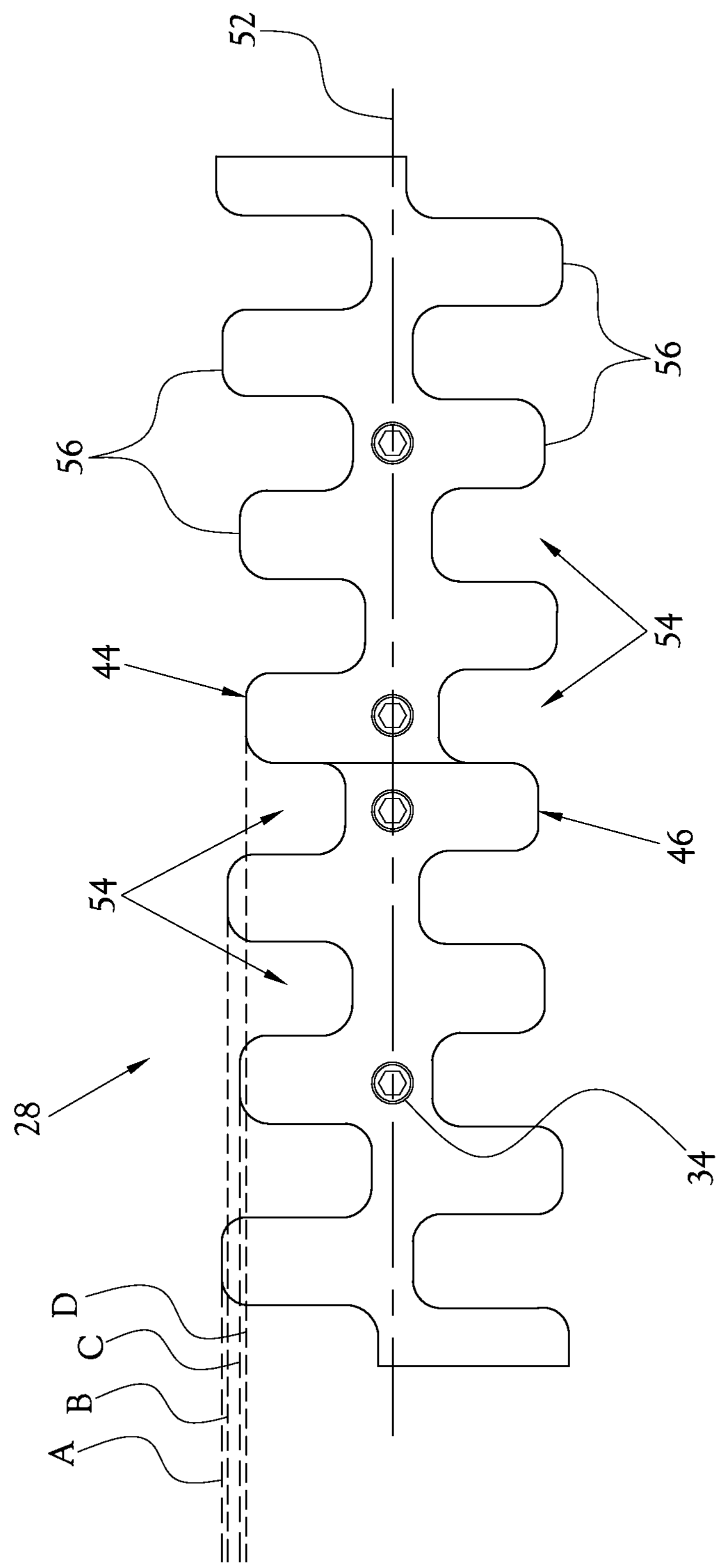
FIG. 6 is a top plan view showing one embodiment of a segment for a belt and tread drum having irregular segment profiles constructed in accordance with several features of the present general inventive concept.

As discussed above, there is provided a plurality of the aforementioned arcuate, circumference-defining segments 28 disposed about the circumference of the drum 10, the cumulative effect of which is to define the overall outer circumferential working surface 12 of the drum 10. As best shown in FIG. 6, each segment 28 of the depicted drum 10 includes first and second longitudinal side margins 44, 46. Each longitudinal side margin 44, 46 defines a plurality of fingers 56 extending along a circumferential dimension of the drum 10, with alternating circumferentially-extending slots 54 defined between the fingers 56. The fingers 56 of each segment 28 are sized and shaped to be received within, and to at least partially mate with, the slots 54 of an adjacent segment 28 in order to maintain a semi-continuous outer circumferential surface of the drum 10 throughout expansion and contraction of the drum 10. For example, in the expanded position of the drum 10 shown in FIGS. 2, 4, and 5, the fingers 56 of the several segments 28 are withdrawn (partially) from the slots 54 of respective adjacent segments 28. By comparison, in the fully collapsed position of the drum 10 shown in FIGS. 1 and 3, the fingers 56 of the several segments 28 are fully received within the slots 54 of respective adjacent segments 28.

In accordance with several features of the present general inventive concept, in various embodiments, at least two of the longitudinally adjacent fingers 56 and/or slots 54 of each side margin 44, 46 of each segment 28 have non-uniform lengths, such that each longitudinal side margin 44, 46 of each segment 28 defines a non-uniform, irregular profile. For example, in the embodiment shown in FIGS. 6 and 7, each finger 56 and corresponding mating slot 54 along each side margin 44, 46 of each segment 28 has a length along a circumferential dimension 58 of the drum 10 that differs from the length of the fingers 56 and slots 54 adjacent thereto. Various of these circumferential lengths are illustrated by lines A-D in FIG. 6 and by lines A-C in FIG. 7. Thus, the various circumferential lengths of the fingers 56 and mating slots 54 along a given side margin 44, 46 of a given segment 28 are non-uniform. As a result, the interface 68 between the first side margin 44 of each given segment 28*b* and the adjacent second side margin 46 of the adjacent segment 28*a* defines a relatively tortuous and non-uniform path along the longitudinal dimension of the drum 10.

For the sake of convenience and for ease of reference herein, reference is made generally to the interface 68 of each segment 28*a* with an adjacent segment 28*b*, and to the "shape" of that interface as defined by the first and second side margins 44, 46 of adjacent segments 28*a*, 28*b*. It will be understood that the term "interface" may refer either to the interface between immediately adjacent segments, as in the fully collapsed position of the drum 10, or to the gap or space located between each first side margin 44 of each segment and the second side margin 46 of a circumferentially adjacent segment, as in an expanded position of the drum 10. It will further be recognized that the shape of each interface 68 is generally defined by the first and second side margins 44, 46 of adjacent segments 28*a*, 28*b*. Therefore, to the extent various embodiments of segments 28 defining interfaces 68 having different shapes are discussed herein, it will be understood that such varying shapes of the interfaces 68 correspond generally to the shapes defined by the corresponding first and second side margins 44, 46 of adjacent segments 28*a*, 28*b*. Furthermore, it will be recognized that, while preferable, the various fingers 46 of each segment 28 need not necessarily be sized and shaped to conform perfectly with a corresponding slot 44 of an adjacent segment 28 in order to accomplish the present general inventive concept. To this end, in certain embodiments, certain of the fingers 56 comprising an interface 68 may be sized slightly shorter than the corresponding mating slot 54, such that in the fully collapsed position of the drum 10, the finger 56 is received only partially into the slot 54.

It will be appreciated that the above-discussed tortuous and non-uniform shape of the interface 68 between adjacent segments 28 of the drum 10 may, in several applications, serve to limit, or altogether eliminate, the manifestation of resonance vibrations in a fast-moving tire having components manufactured using the drum 10. To this end, it will be recognized that the tortuous and non-uniform shapes of the interfaces 68 of the various segments 28 of the drum 10 result in a less uniformly repeating pattern of interfaces along the circumference of the drum 10, as compared to more traditional tire building drum designs. Thus, to the extent a belt and tread package manufactured using the drum 10 is imparted with any imprints and bulges as a result of the interfaces 68 of the various segments 28 about the circumference of the drum 10, such imprints and bulges may form a similarly non-uniformly repeating pattern about the circumference of the belt and tread package. Furthermore, to the extent a tire incorporating the belt and tread package is subjected to rolling speeds or other such conditions which may induce pattern-based resonance vibrations in the tire, the non-uniformly repeating pattern of such imprints and bulges about the belt and tread package may discourage, or altogether eliminate, such resonance.

Figure 7:
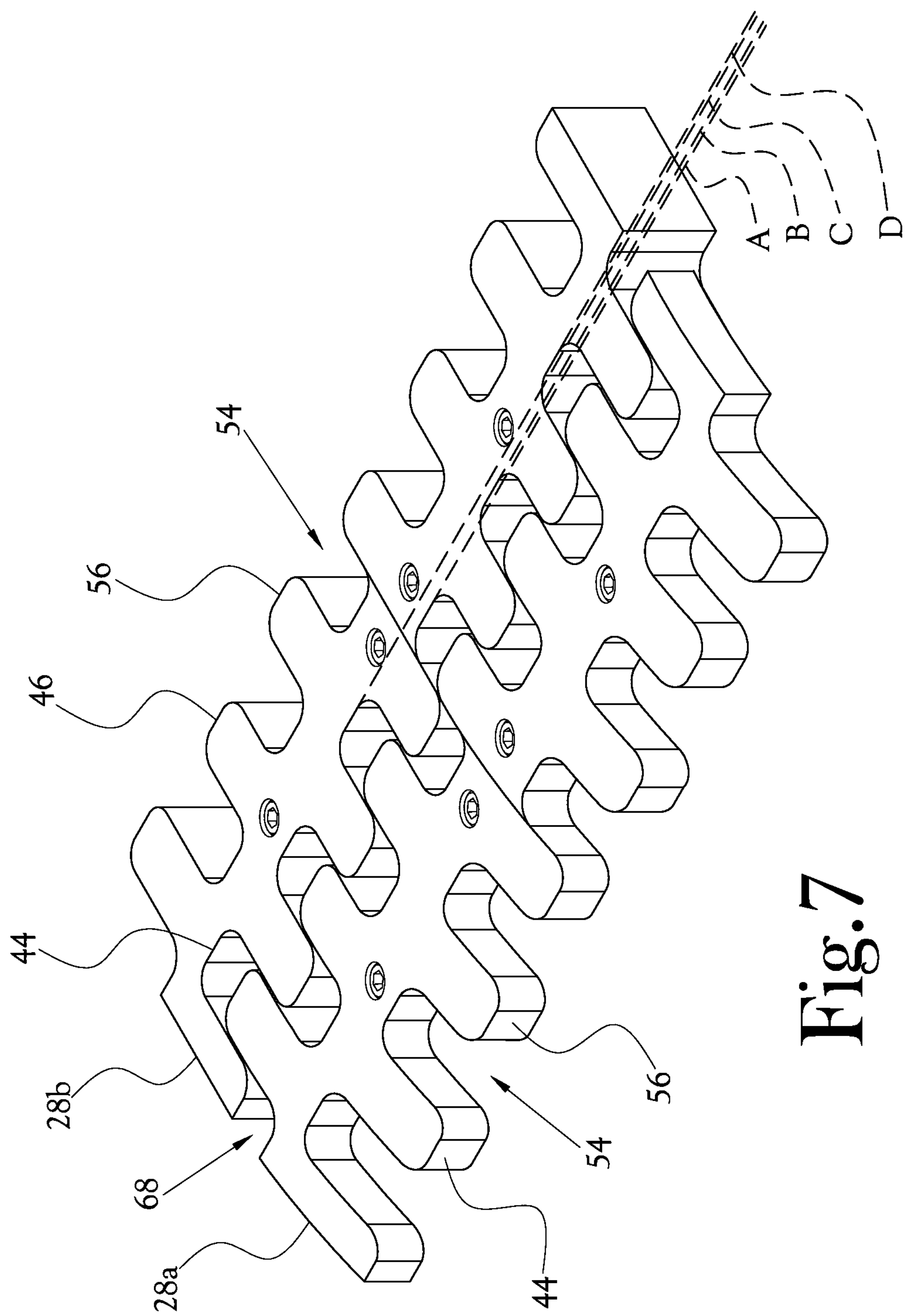
FIG. 7 is a perspective view of two of the segments as shown in FIG. 6, showing the segments in adjacent relation to one another in a partially expanded position.

It will further be recognized that, in various embodiments, the general shape, ordering, and arrangement of the mating fingers 56 and slots 54 along the longitudinal dimension of each segment 28 may take the form of any of a large number of varying configurations without departing from the spirit and scope of the present general inventive concept. For example, in some embodiments, each of the fingers 56 of each first side margin 44, and the corresponding mating slots 54 of the second side margin 46 of the adjacent segment 28, may define different circumferential lengths. In such embodiments, the ordering and arrangement of mating fingers 56 and slots 54 can be irregular, such as for example in a randomized pattern, or arranged in order of ascending or descending circumferential length along the longitudinal dimension of the segment 28. Still further, the mating fingers 56 and slots 54 on a given side margin 44, 46 of a given segment 28 can be arranged in an order corresponding to alternating circumferential length. In other embodiments, two or more of the fingers 56 of each first side margin 44, and the corresponding mating slots 54 of the adjacent side margin 46 of the adjacent segment 28, may define substantially equal lengths, while at least one other finger 56 and corresponding mating slot 54 defines a different length. Again, in such embodiments, the ordering and arrangement of the fingers of substantially equal length and the finger or fingers of one or more different lengths may be irregular or patterned. Those skilled in the art will recognize other such configurations which are suitable to accomplish the irregular longitudinal profile of the side margins 44, 46 of the segment 28, and such configurations may be used without departing from the spirit and scope of the present general inventive concept. Furthermore, it will further be understood that, while FIGS. 6 and 7 show an elongated segment 28 having seven mating fingers 56 and slots 54, with each finger 56 and slot 54 being of a relatively uniform longitudinal width, the various mating fingers 56 and slots 54 along each side margin 44, 46 may define narrower or wider longitudinal widths in relation to one another. It will further be recognized that each side margin 44, 46 may define a greater or fewer number of mating fingers 56 and slots 54 along the longitudinal dimension thereof.

In several embodiments, the various segments 28 comprising the outer circumferential working surface 12 of the drum 10 each define similar longitudinal profiles along their respective first and second side margins 44, 46, such that each interface 68 between each pair of adjacent segments 28 is shaped similarly to the remaining interfaces 68 about the circumference of the drum 10. However, in order to further reduce, or eliminate altogether, resonance vibrations that may manifest in a tire manufactured using a drum 10 constructed in accordance with certain features of the present general inventive concept, in several embodiments, each interface 68 of circumferentially adjacent first and second side margins 44, 46 about the circumference of the drum 10 defines a longitudinal profile differing in shape from the longitudinal profiles of other interfaces 68 about the circumference of the drum 10. For example, in one embodiment, each interface 68 of segments 28 of the drum 10 defines a longitudinal profile which differs in shape from each other interface 68 about the circumference of the drum 10. In other embodiments, certain of the interfaces 68 about the drum 10 may be of identical shape to one another, while certain other of the interfaces 68 of the drum may define one or more other shapes. In still other embodiments, certain of the interfaces 68 of the drum 10 may define longitudinal profiles having a regular, patterned shape, while other of the interfaces 68 of the drum 10 may define longitudinal profiles having an irregular longitudinal profile. For example, in one embodiment, only one of the interfaces 68 of the segments 28 about the circumference of the drum 10 defines an irregular longitudinal profile. The remaining interfaces 68 are defined by first and second side margins 44, 46 of adjacent segments 28 having alternating fingers 56 and slots 54 of substantially equal length, thus defining interfaces 68 having regular, patterned profile shapes. It will be recognized that, in each of these embodiments, at least one of the various interfaces 68 between the first side margins 44 and second side margins 46 of adjacent segments 28 differs slightly in shape from the remaining interfaces 68 about the circumference of the drum 10. Thus, a tire component produced using the drum 10 is not imparted with a regular, repeating pattern of imprints or bulges about its circumference. In this way, the irregular longitudinal profile of at least one segment 28 of the drum 10 may assist in minimizing resonance or, ideally, eliminating resonance in a finished tire fabricated from components manufactured using the drum 10.

In the illustrated embodiment, notwithstanding the above-discussed irregular longitudinal profiles defined by the circumferentially-extending fingers 56 and slots 54 of the first and second side margins 44, 46 of each segment 28, each of the segments 28 defines, overall, a generally elongated shape extending generally parallel to along the longitudinal centerline 52 of the drum 10. In this embodiment, each segment 28 is secured along a longitudinal centerline of the segment 28 to a radially outer edge of one of the corresponding planar cam elements 38. By way of illustration, in FIG. 6, the longitudinal centerline of the segment 28 is shown as corresponding approximately with the longitudinal centerline 52 of the drum 10, and each of the above-discussed bolts 34 is located generally along the longitudinal centerline of the segment 28. However, in other embodiments, each of the segments 28 is secured to a radially outer edge of a corresponding planar cam element 38 at a location along the segment 28 offset from the longitudinal centerline 52 of the segment 28. For example, in some embodiments, each of the segments 28 defines an overall irregular shape. In these embodiments, the overall irregular shape of each of the segments 28, and their offset mounting about the drum 10, may contribute to an irregular spacing of the various interfaces 68 of the segments 28 from one another about the circumference of the drum 10. This irregular spacing may, in certain embodiments, further contribute to minimizing the presence of regular, repeating patterns of interfaces 68 about the drum 10, thereby limiting the manifestation of resonance or, ideally, eliminating resonance, in a finished tire manufactured using the drum 10.

Figure 8:
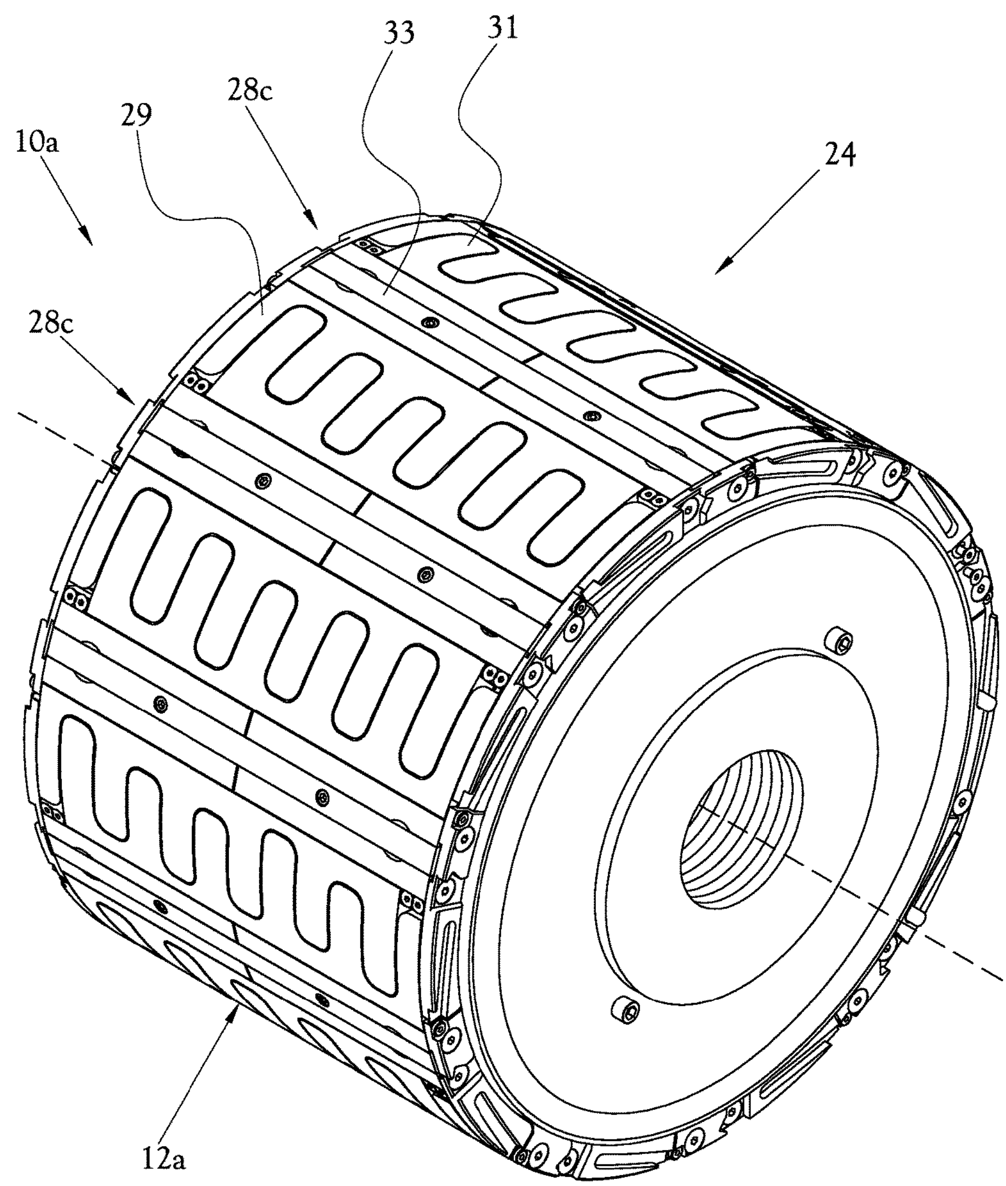
FIG. 8 is a perspective view of another embodiment of an expandable belt and tread drum having irregular segment profiles constructed in accordance with several features of the present general inventive concept.
Figure 9:
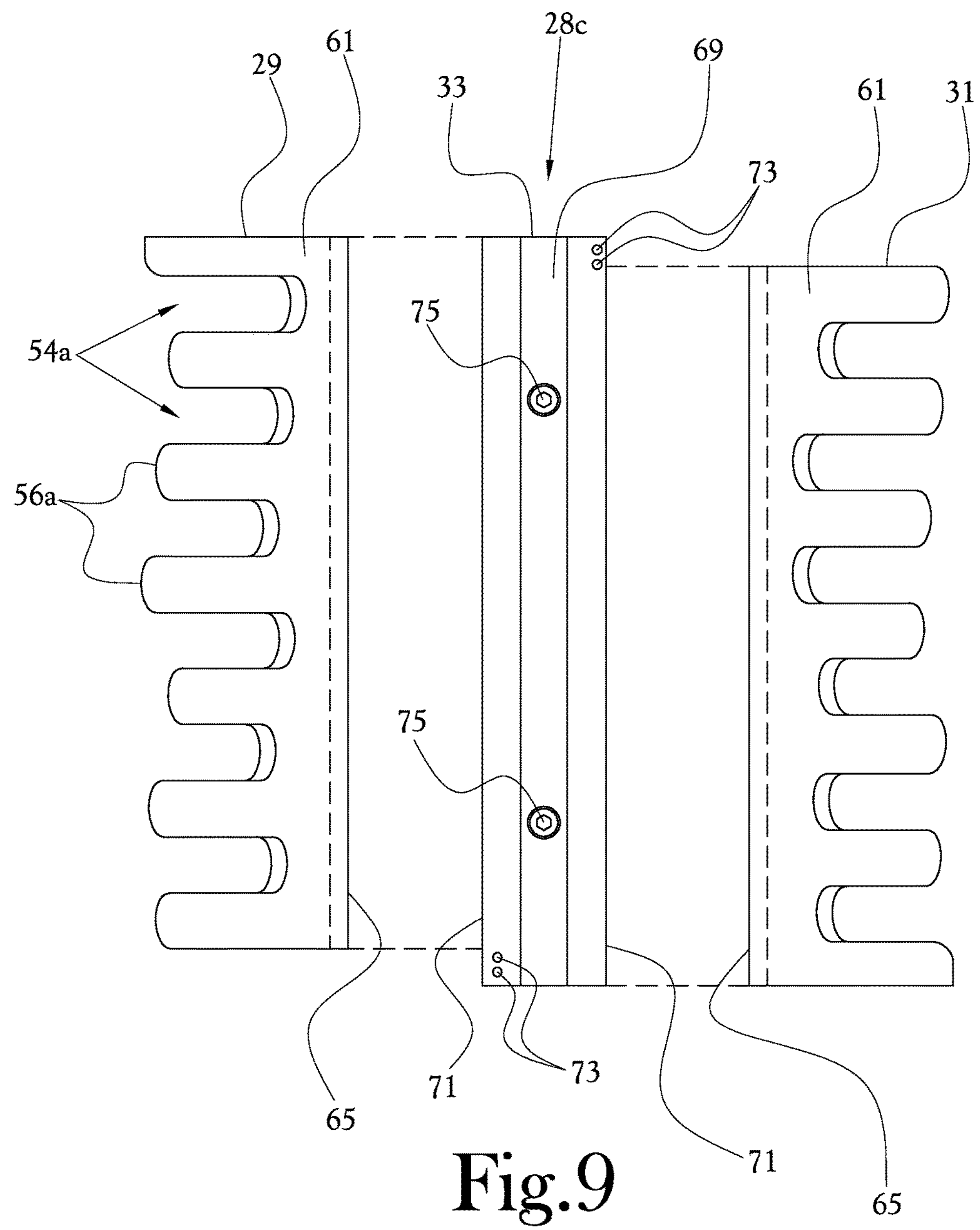
FIG. 9 is a top plan view showing another embodiment of a segment for a belt and tread drum having irregular segment profiles constructed in accordance with several features of the present general inventive concept.
Figure 10:
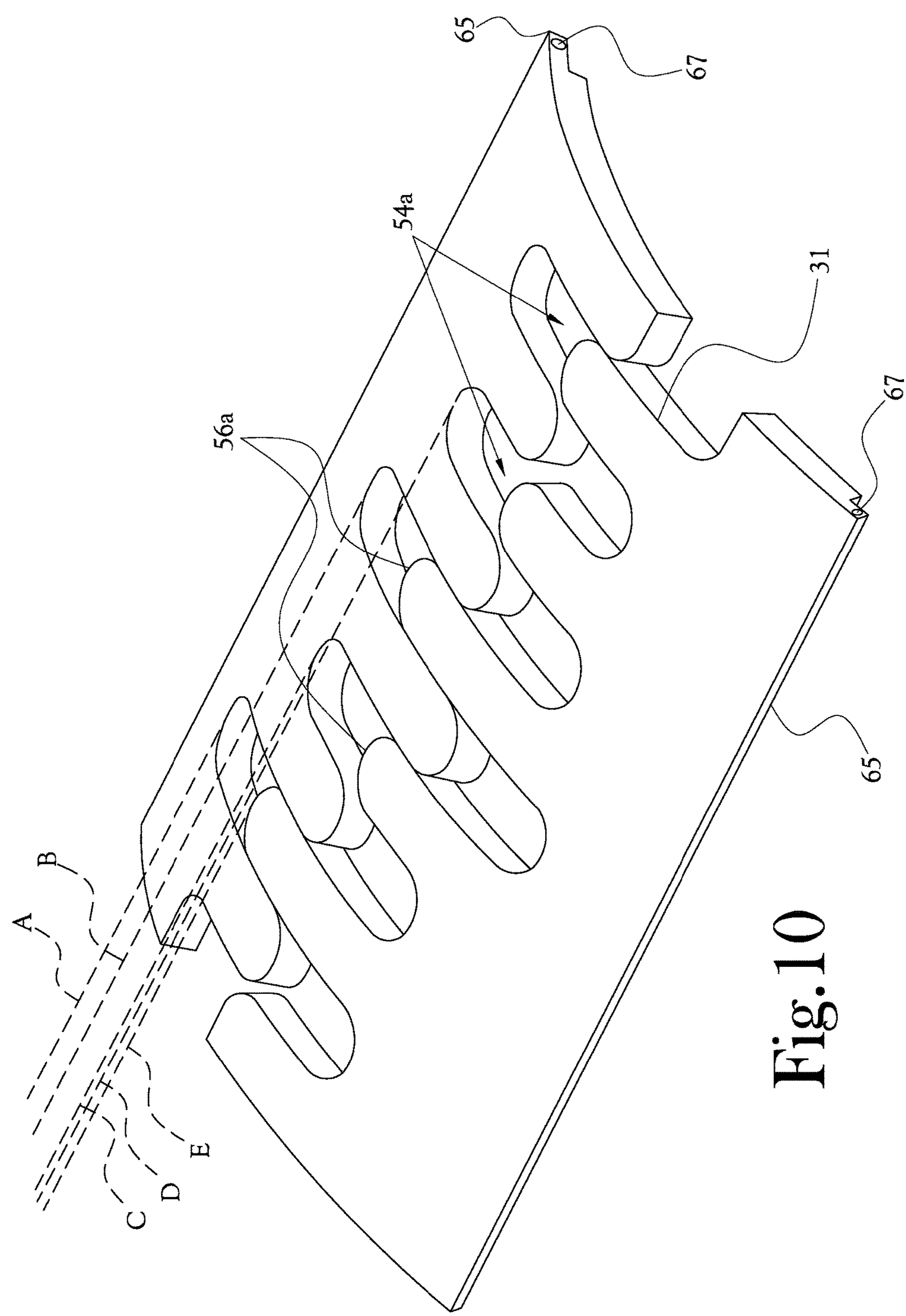
FIG. 10 is a perspective view showing two mating portions of segments of the type shown in FIG. 9.

FIGS. 8-10 illustrate another embodiment of a drum 10*a* constructed in accordance with several features of the present general inventive concept. In the embodiment of FIGS. 8-10, the body portion 24 of the depicted belt and tread drum 10*a* includes a plurality of circumference-defining, multi-sectioned segments 28*c* whose outer arcuate surfaces collectively define a portion of the outer circumferential working surface 12*a* of the drum 10*a*. As best shown in FIG. 9, each segment 28*c* of the depicted drum 10*a* includes a first side section 29, a second side section 31 and an intermediate section 33 disposed between the side sections 29 and 31. Each side section 29, 31 of each segment 28*a* defines a plurality of slots 54*a* along a circumferentially outer one of its longitudinal side margins. Defined between these slots 54*a* are alternating fingers 56*a* that are designed to be received within the slots 54*a* of the side section 29, 31 of an adjacent segment 28*c*. In FIG. 8, the drum 10*a* is again depicted in its collapsed position, at its minimum circumference, with the fingers 56*a* of the several segments 28*c* being received within the slots 54*a* of respective adjacent segments 28*c*.

With reference to FIGS. 9 and 10, each side section 29, 31 extends along almost the entire longitudinal dimension of the drum 10*a* and defines an outer arcuate surface 61. In addition, each side section 29 and 31 includes a stepped marginal edge opposite the fingers 56*a* having a lip 65. There is provided in each end of the lip 65 a bore 67 which is used to hingedly attach the side section 29, 31 to the intermediate section 33 through an appropriate hinge connection (not shown). The intermediate section 33 extends along substantially the entire length of the drum 10*a* and includes an outer arcuate surface 69. Furthermore, each intermediate section 33 includes a stepped marginal surface extending along the circumferential sides thereof and which includes a lip 71. As depicted in FIG. 9, provided along one side of each lip 71 are a pair of internally-threaded openings 73 used in the hinged attachment of the intermediate section 33 to a corresponding one of the side sections 29, 31. Defined in the outer surface 66 of the intermediate section 33 and adjacent the ends thereof are through-bores 75 for accepting the bolts 34 with which the segment 28*c* is attached to a corresponding cam element.

Similarly to the above-discussed embodiment, in the embodiment of FIGS. 8-10, at least one slot 54*a* of each side section 29, 31, along with its corresponding mating finger 56*a* of its adjacent side section 29, 31, has a circumferential length differing from the circumferential length of at least one of the other slots 54*a* and fingers 56*a* longitudinally adjacent thereto. Thus, the circumferential lengths of the slots 54*a* and fingers 56*a* along a given side section 29, 31 are non-uniform. Various of these different circumferential lengths are illustrated by lines A-E in FIG. 10. It will be appreciated that, similarly to the above-discussed embodiment, the ordering of the mating slots 54*a* and fingers 56*a* can vary, and may for example be irregular, such as for example in a randomized pattern, in ascending or descending circumferential length order, or in other patterns or configurations. Still further, the slots 54*a* and fingers 56*a* along a given side section 29, 31 may be arranged in alternating circumferential length order. Those skilled in the art will recognize other configurations which are suitable, and such configurations may be used without departing from the spirit and scope of the present general inventive concept. It will further be understood that, while FIGS. 8-10 show an elongated segment 422 having six slots 54*a* and fingers 56*a* of a selected longitudinal width, the slots 54*a* and fingers 56*a* could have narrower or wider longitudinal widths allowing for a greater or fewer number of slots 54*a* and fingers 56*a* along each side section 29, 31.

Figure 11:
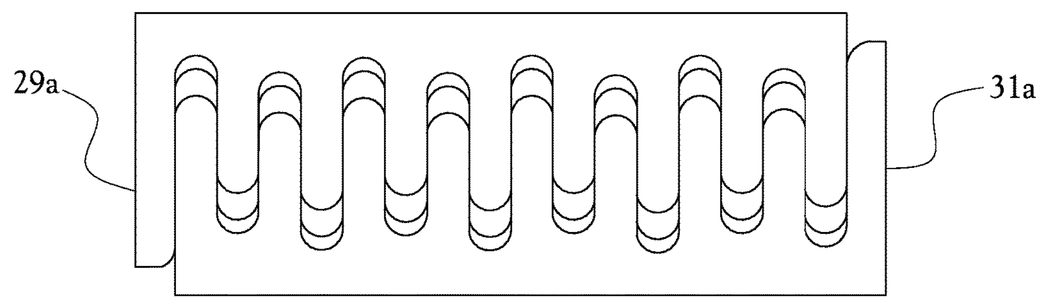
FIG. 11 is a top plan view showing another embodiment of a segment for a belt and tread drum having irregular segment profiles constructed in accordance with several features of the present general inventive concept.
Figure 12:
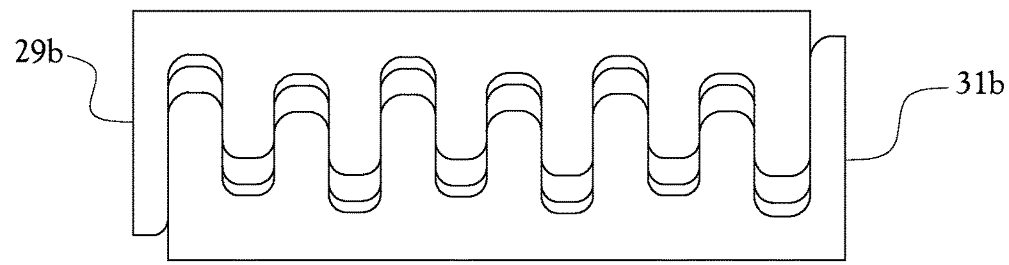
FIG. 12 is a top plan view showing another embodiment of a segment for a belt and tread drum having irregular segment profiles constructed in accordance with several features of the present general inventive concept.
Figure 13:
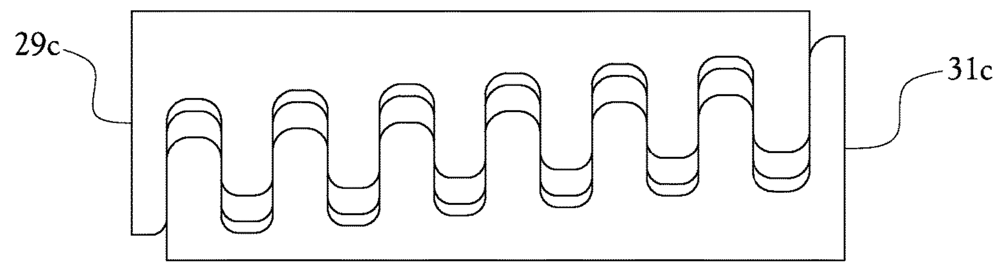
FIG. 13 is a top plan view showing another embodiment of a segment for a belt and tread drum having irregular segment profiles constructed in accordance with several features of the present general inventive concept.

FIGS. 11-13 depict various example embodiments of the above-discussed side sections 29, 31, and illustrate various example arrangements and configurations of mating slots 54*a* and fingers 56*a* of differing lengths which may be utilized in achieving one or more embodiments of a segment pursuant to the present general inventive concept. In the embodiment of FIG. 11, partially mated first and second side sections 29*a*, 31*a* are depicted. In the embodiment of FIG. 11, the ordering of the mating slots and fingers along the longitudinal dimension of the side sections 29*a*, 31*a* defines an irregular, randomized pattern. FIG. 12 illustrates partially mated first and second side sections 29*b*, 31*b*. In the embodiment of FIG. 12, the ordering of the mating slots and fingers along the longitudinal dimension of the side sections 29*b*, 31*b* defines an alternating pattern of first and second circumferential lengths. FIG. 13 illustrates partially mated first and second side sections 29*c*, 31*c*, in which the ordering of the mating slots and fingers along the longitudinal dimension of the side sections 29*c*, 31*c* defines an ascending pattern of circumferential lengths. Those skilled in the art will recognize other arrangements and configurations of the slots 54*a* and fingers 56*a* which may be used without departing from the spirit and scope of the present general inventive concept.

From the foregoing description, it will be recognized by those skilled in the art that a belt and tread drum has been provided which incorporates irregular shaping of segments forming an outer circumference of the drum in order to reduce the formation of repeating imprint patterns in a tire component manufactured using the drum. It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment. Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. However, while the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A segment defining a portion of an outer circumferential working surface of a tire building drum, the segment having an arcuate outer surface and defining opposite first and second longitudinal side margins, at least one of the first and second longitudinal side margins defining an irregular longitudinal profile, the at least one longitudinal side margin defining a plurality of alternating slots and fingers extending there from along an arcuate dimension of the segment, and wherein the plurality of alternating slots and fingers are configured with differing lengths such that at least four consecutive fingers comprising in sequence a first finger, a second finger, a third finger, and a fourth finger are arranged along one of the longitudinal side margins and are configured such that the first finger has a first length, the second finger adjacent to the first finger has a second length shorter than the first length, the third finger adjacent to the second finger has a third length shorter than the first length and longer than the second length, and the fourth finger adjacent to the third finger has a fourth length shorter than the second length.

2. The segment of claim 1, each of the fingers having a length along the arcuate dimension of the segment differing from a length of a longitudinally adjacent finger.

3. The segment of claim 2, each of the fingers having a length along the arcuate dimension of the segment differing from the lengths of the remaining fingers along the at least one longitudinal side margin.

4. The segment of claim 1, wherein the first longitudinal side margin defines a first set of alternating slots and fingers extending therefrom along an arcuate dimension of the segment and the second longitudinal side margin defines a second set of alternating slots and fingers extending therefrom along an arcuate dimension of the segment.

5. The segment of claim 4, wherein each of the fingers of the first set of alternating fingers and slots has a length along the arcuate dimension of the segment differing from a length of a longitudinally adjacent finger.

6. The segment of claim 5, wherein each of the fingers of the second set of alternating fingers and slots has a length along the arcuate dimension of the segment differing from a length of a longitudinally adjacent finger.

7. The segment of claim 6, the slots of the first set of alternating fingers, and slots being shaped for mating engagement with fingers of a second set of alternating fingers and slots of an adjacent segment, and the slots of the second set of alternating fingers and slots being shaped for mating engagement with fingers of a first set of alternating fingers and slots of an adjacent segment.

8. The segment of claim 7, each finger of the first set of alternating fingers and slots having a length along the arcuate dimension of the segment differing from the lengths of the remaining fingers of the first set of alternating fingers and slots, and each finger of the second set of alternating fingers and slots having a length along the arcuate dimension of the segment differing from the lengths of the remaining fingers of the second set of alternating fingers and slots.

9. In a segment forming a portion of an outer cylindrical working surface of a belt and tread drum of the type useful for manufacturing vehicle tires, wherein the segment comprises an outer surface defining a portion of the cylindrical working surface, the outer surface having a longitudinal dimension parallel to a central axis of the cylindrical working surface and a circumferential dimension along a circumference of the cylindrical working surface, the improvement comprising:

a plurality of alternating slots and fingers defined along the outer surface and extending along the circumferential dimension to define a longitudinal side margin, each finger being sized and shaped to at least partially mate with a corresponding slot of an adjacent segment; and wherein longitudinally adjacent slots and fingers along the outer surface are configured with differing lengths such that at least four consecutive fingers comprising in sequence a first finger, a second finger, a third finger, and a fourth finger are arranged along the longitudinal side margin and are configured such that the first finger has a first length, the second finger adjacent to the first finger has a second length shorter than the first length, the third finger adjacent to the second finger has a third length shorter than the first length and longer than the second length, and the fourth finger adjacent to the third finger has a fourth length shorter than the second length.

10. The segment of claim 9, the outer surface having opposite first and second longitudinal side margins, wherein the plurality of alternating slots and fingers are arranged along both first and second longitudinal side margins of the outer surface.

11. The segment of claim 10, each finger of the first side margin being sized and shaped to at least partially mate with a corresponding slot of a second side margin of an adjacent segment, and each slot of the first side margin being sized and shaped to at least partially mate with a corresponding finger of a second side margin of an adjacent segment.

12. The segment of claim 11, each finger having a length along the circumferential dimension of the segment differing from a length of a longitudinally adjacent finger.

13. The segment of claim 11, each finger of the first side margin having a length along the circumferential dimension of the segment differing from the lengths of the remaining fingers of the first side margin, and each finger of the second side margin having a length along the circumferential dimension of the segment differing from the lengths of the remaining fingers of the second side margin.

14. A belt and tread drum for use in the manufacture of vehicle tires comprising:

a plurality of segments mounted in side-by-side relationship about a central axis for radial movement inwardly and outwardly with respect to the central axis, the segments including arcuate outer surfaces which collectively define an outer circumferential working surface of the drum, each segment including a plurality of alternating slots and fingers extending along a circumferential dimension of the drum to define opposite first and second longitudinal side margins of the segment, each finger of each first side margin being sized and shaped to at least partially mate with a corresponding slot of a second side margin of an adjacent segment, and each slot of each the first side margin being sized and shaped to at least partially mate with a corresponding finger of a second side margin of an adjacent segment, wherein the plurality of alternating slots and fingers are configured with differing lengths such that at least four consecutive fingers comprising in sequence a first finger, a second finger, a third finger, and a fourth finger are arranged along one of the longitudinal side margins and are configured such that the first finger has a first length, the second finger adjacent to the first finger has a second length shorter than the first length, the third finger adjacent to the second finger has a third length shorter than the first length and longer than the second length, and the fourth finger adjacent to the third finger has a fourth length shorter than the second length.

15. The belt and tread drum of claim 14, wherein each of the fingers along at least one side margin of at least one segment has a circumferential length differing from the circumferential length of a longitudinally adjacent finger.

16. The belt and tread drum of claim 14, wherein each pattern of alternating slots and fingers of each first side margin of each segment differs from a pattern of alternating slots and fingers of the first side margin of an adjacent segment.

17. The belt and tread drum of claim 16, wherein each of the fingers along each side margin of each segment has a circumferential length differing from the circumferential length of a longitudinally adjacent finger.

* * * * *